United States Patent
Vartanian et al.

(10) Patent No.: US 8,935,111 B2
(45) Date of Patent: Jan. 13, 2015

(54) ENERGY STORAGE BASED COUNTERMEASURE FOR A DELAYED VOLTAGE RECOVERY

(75) Inventors: Charles Vartanian, Huntington Beach, CA (US); C. Michael Hoff, Boxborough, MA (US); David Colucci, Lynnfield, MA (US); Peter Gottlieb, Dobbs Ferry, NY (US)

(73) Assignee: NEC Energy Solutions, Inc., Westborough, MA (US)

( * ) Notice: Subject to any disclaimer, the term of this patent is extended or adjusted under 35 U.S.C. 154(b) by 663 days.

(21) Appl. No.: 12/891,945

(22) Filed: Sep. 28, 2010

(65) Prior Publication Data

US 2011/0074215 A1    Mar. 31, 2011

Related U.S. Application Data

(60) Provisional application No. 61/246,372, filed on Sep. 28, 2009.

(51) Int. Cl.
*G01R 21/00* (2006.01)
*G01R 21/06* (2006.01)
*H02J 3/32* (2006.01)
*H02J 3/12* (2006.01)
*G01D 4/00* (2006.01)
*H02J 13/00* (2006.01)
*H02J 3/00* (2006.01)
*H02J 3/18* (2006.01)

(52) U.S. Cl.
CPC ... *H02J 3/32* (2013.01); *H02J 3/12* (2013.01); *G01D 4/004* (2013.01); *H02J 13/0013* (2013.01); *H02J 2003/001* (2013.01); *Y02B 90/242* (2013.01); *Y04S 20/322* (2013.01); *H02J 3/18* (2013.01); *Y04S 10/14* (2013.01); *Y04S 10/22* (2013.01); *Y04S 10/525* (2013.01); *Y04S 40/12* (2013.01); *Y02E 60/722* (2013.01); *Y02E 60/7807* (2013.01); *Y02E 40/74* (2013.01)
USPC .............................. 702/62; 702/122; 702/188

(58) Field of Classification Search
USPC .................. 702/57, 60, 61, 62, 122, 127, 189
See application file for complete search history.

(56) References Cited

U.S. PATENT DOCUMENTS 2,196,029 A * 4/1940 St Palley ....................... 323/344
3,196,336 A * 7/1965 Schmidt ........................ 363/96
(Continued)

OTHER PUBLICATIONS

Shinichi Imai, Undervoltage load shedding improving security as rasonable measure for extreme contingencies, 2005, pp. 1156-1161.*
Nerc, A Technical Reference Paper Fault-Induced Delayed Voltage Recovery, Jun. 2009, pp. 1-32.*

(Continued)

*Primary Examiner* — John Breene
*Assistant Examiner* — Yaritza H Perez Bermudez
(74) *Attorney, Agent, or Firm* — Chapin IP Law, LLC

(57) ABSTRACT

The disclosed system includes a metering device for monitoring electrical power grid conditions, a controller for determining if the metering device is detecting a condition on an electrical grid that is indicative of a delayed voltage recovery event, and a communication device for communicating with one or more remotely located bi-directional power source modules connected to the electrical power grid, wherein the controller is programmed to send a notification via the communication device to the one or more remotely located bi-directional power source modules if the controller detects a condition indicative of delayed voltage recovery event. In some embodiments, the metering device includes a grid metering device. In some embodiments, the metering device measures power factor, and a change in the voltage and ratio of VARs to Watts.

25 Claims, 6 Drawing Sheets

(56) References Cited

U.S. PATENT DOCUMENTS

| | | |
|---|---|---|
| 6,392,856 B1* | 5/2002 | Kehrli et al. .................... 361/64 |
| 6,424,156 B1* | 7/2002 | Okamura ...................... 324/426 |
| 6,987,331 B2* | 1/2006 | Koeppe et al. ................. 307/66 |
| 2008/0077336 A1* | 3/2008 | Fernandes ..................... 702/57 |

OTHER PUBLICATIONS

Williams et al. Transmission Voltage Recovery Delayed by Stalled Air Conditioner Compressors, Aug. 1992, pp. 1173-1181.*
International Search Report and Written Opinion for International Application No. PCT/US2010/050527 mailed Nov. 29, 2010. 16 pages.

* cited by examiner

ENERGY STORAGE BASED COUNTERMEASURE FOR A DELAYED VOLTAGE RECOVERY

CROSS REFERENCE TO RELATED APPLICATIONS

This application claims the benefit of U.S. Provisional Application 61/246,372, filed on Sep. 28, 2009, the entire contents of which are hereby incorporated by reference.

TECHNICAL FIELD

This application relates to a delayed voltage recovery, that is, a battery-based delayed voltage recovery ("DVR") system The DVR system can provide a countermeasure to mitigate and reduce the severity of DVR events on bulk electric power grids.

BACKGROUND

FIG. 1 illustrates the performance-degrading phenomena of DVR on the bulk electric grid, by showing a Fault-Induced Delayed Voltage Recovery ("FIDVR") following a 230-kV transmission fault in Southern California. The x axis is time and the y axis is voltage. Section 100 of FIG. 1 depicts the steady state voltage. At time 102, a fault occurs and clears on the grid. A fault is a short circuit on the utility line caused by, for example, a tree falling onto the line or a lightning strike, or any other event that would cause a short circuit in the utility line. The high currents associated with faults can cause a substantial reduction in line voltage due to the basic relationship of V=IR, or voltage=current times resistance. During the fault, the utility line voltage may drop by half or more. The duration of faults on utility transmission and distribution equipment is typically very short 4-10 cycles, or fraction of a second, before the faulted equipment is isolated through the opening of breakers. Normally, voltage at the grid level should immediately return to pre-fault normal levels as soon as the faulted equipment is opened/isolated and fault current ceases to flow.

However, if the system is not operating normally, during the brief second that the fault is occurring, a motor, for example, an air conditioner, may sense the large voltage drop and stall. Some air conditioners disconnect from the grid based on voltage drops, while others only will disconnect when a thermal sensor detects an elevated operating temperature. Therefore, this second set of air conditioners will not disconnect at the voltage drop caused by a fault. Instead, because of the drop in voltage, the air conditioner may stall and draw 6-8 times more current than when in normal operation. The large current draw causes the air conditioner to produce excess heat. These air conditioners may not disconnect until the thermal sensor detects a requisite level of heat, which may be 20-30 seconds after the fault has occurred. The stalled air conditioners also may cause other thermal sensor air conditioners to stall. This can build upon itself into a type of blackout called a voltage collapse. Therefore, these thermal condition triggered air conditioners exacerbate the fault and create a DVR condition. Because of the growing number of residential air conditioners with thermal sensors, DVR conditions have become a larger problem.

Referring back to FIG. 1, time period 104 is the delayed voltage recovery period during which some loads (e.g. motors, air conditioners, etc.) may stall and start to disconnect from the grid via thermal protection switches. Typically, period 104 can extend for about 20 seconds. Then, at time 106, a power overshoot typically occurs, caused by line and substation voltage-support capacitors remaining on line. At time 108, the capacitors disconnect because of the overshoot in voltage at time 106. At time 110, the loads that had previously disconnected come back online. At time 112, the grid is under voltage for a time period while the capacitors that turned off at time 108 remain off. This under voltage period increases the likelihood of another delayed voltage recovery event. Taken together the recovery time, that is, the time it takes the system to return to steady state conditions at 100 after fault 102 can last up to approximately 30 seconds. As shown in FIG. 1, the voltage deviation on the grid during a delayed voltage recovery event can be extreme.

The first recorded DVR event was in the Tennessee Valley Authority transmission system on Aug. 22, 1987. Present systems have been unable to detect DVRs as they occur; most DVRs are detected long after the fact by reviewing power grid data.

Known prior-deployed solutions have included combustion turbine driven electric generators and Static VAR Compensators, or SVC's. However, generators burn fossil fuel, thereby wasting resources and adding green house gasses, and some generators do not have response times adequate (fast enough) to prevent a voltage collapse. SVC's have declining volt-amperes reactive ("VAR") output versus terminal voltage. Thus, when VAR support is needed most, these solutions have reduced output capacity and effectiveness. Currently, there are limited power industry options and solutions to this relatively new/emerging risk to the U.S. electric power system.

SUMMARY

Some embodiments of the invention provide one or more of the following advantages over existing systems:

a. ability to impart significant power rapidly and bi-directionally (inject and absorb power) through use of a power source that has a high power capacity, enabling a single device to effectively support a wide area of the electric grid;

b. ability to discriminate for a specific grid-condition indicative of a delayed voltage recovery event; and c. use of a power-electronic interface (inverter) between the power source and the grid to manage the dynamic, rapidly changing bi-directional flow of power that would be delivered during operation of the system to mitigate the delayed voltage recovery.

In one aspect, the disclosed system includes a metering device for monitoring electrical power grid conditions, a controller for determining if the metering device is detecting a condition on an electrical grid that is indicative of a delayed voltage recovery event, and a communication device for communicating with one or more remotely located bi-directional power source modules connected to the electrical power grid, wherein the controller is programmed to send a notification via the communication device to the one or more remotely located bi-directional power source modules if the controller detects a condition indicative of delayed voltage recovery event. In some embodiments, the metering device includes a grid metering device. In some embodiments, the metering device measures power factor, and a change in the voltage and ratio of VARs to Watts.

In another aspect, the system includes a bi-directional power source, an inverter for connecting the bi-directional power source to an electrical grid, a communication interface for receiving communications from a remote device, a metering device for measuring one or more characteristics of the electrical grid, and a controller in electrical communication with the inverter, the communication interface and the metering device, wherein the controller is programmed to respond to a notification of a delayed voltage recovery received from the communication interface by causing the inverter to counteract the delayed voltage recovery event, and wherein the inerter counteracts the delayed voltage recovery by injecting power from the bi-direction power source into the electric grid or extracting power from the electrical grid based on the one or more characteristics measured by the metering device. In one embodiment, the bi-directional power source can include a battery, an energy capacitor or a mechanical energy storage device. In some embodiments, the metering device comprises a terminal voltage metering device.

In another aspect, the system includes a grid metering device for monitoring electrical power grid conditions, a system controller for determining if the grid metering device is detecting a condition on the electrical grid that is indicative of a delayed voltage recovery event, a remotely located bi-direction power source module including: a bi-directional power source, an inverter for connecting the bi-directional power source to the electrical grid, a communication interface for receiving communications, a module metering device for measuring one or more characteristics of the electrical grid, and a module controller in electrical communication with the inverter, the communication interface and the module metering device, and a communication device for communicating with the communication interfaces of one or more remotely located bi-directional power source modules connected to the electrical power grid, wherein the system controller is programmed to send a notification via the communication device to the one or more remotely located bi-directional power source modules if the system controller detects a condition indicative of delayed voltage recovery event, wherein the module controller is programmed to respond to the notification of a delayed voltage recovery received from the communication device by causing the inverter to counteract the delayed voltage recovery event, and wherein the inverter counteracts the delayed voltage recovery by injecting power from the bi-direction power source into the electric grid or extracting power from the electrical grid based on the one or more characteristics measured by the module metering device.

In another aspect, the disclosure relates to a method including monitoring one or more conditions on an electrical grid, determining if the one or more conditions on the electrical grid is indicative of a delayed voltage recovery event, and transmitting a notification to one or more remotely located bi-directional power source modules if a condition indicative of delayed voltage recovery event is determined. In some embodiments, the electrical grid conditions include one of power factor or a change in the voltage and ratio of VARs to Watts.

In another aspect, the disclosure relates to a method including monitoring receiving a notification of a delayed voltage recovery from a remote device, measuring one or more characteristics of the electrical grid, and counteracting the delayed voltage recovery event by injecting power from a bi-direction power source into the electric grid or extracting power from the electrical grid based on the one or more of the measured characteristics. In some embodiments, the bi-directional power source can be a battery, an energy capacitor or a mechanical energy storage device. In some embodiments, the characteristics of the electrical grid comprise terminal voltage.

In another aspect, the disclosure relates to a method including monitoring one or more conditions on an electrical grid, determining if the one or more conditions on the electrical grid is indicative of a delayed voltage recovery event, transmitting a notification to one or more remotely located bi-directional power source modules if a condition indicative of the delayed voltage recovery event is determined, measuring at the remote location one or more characteristics of the electrical grid; and counteracting the delayed voltage recovery event by injecting power from the bi-direction power source into the electric grid or extracting power from the electrical grid based on the one or more characteristics measured at the remote location.

BRIEF DESCRIPTION OF THE DRAWINGS

For a more complete understanding of various embodiments of the present disclosure, reference is now made to the following descriptions taken in connection with the accompanying drawings in which.

DESCRIPTION

The energy storage based countermeasure system disclosed herein detects and corrects for a delayed voltage recovery event by using a distributed system of grid metering devices and power sources. The disclosed system detects the delayed voltage recovery event using grid metering devices deployed throughout the electrical grid, for example, at various locations on the grid from distribution circuits through substations. These grid metering devices communicate with a controller that will trigger operation of distributed power sources when a delayed voltage recovery event is detected. The triggered power sources can provide countermeasures to the delayed voltage recovery event by both injecting and absorbing power to and from the grid.

The described countermeasure to a detected DVR operates by rapidly injecting power (real and reactive) into the electric grid to counteract depressed electric system voltages during bulk electric system DVR events after a fault has occurred and has been cleared, but the system voltage remains depressed for an unacceptable period (10 seconds or more). This countermeasure for a DVR event is able to 1) detect and discriminate for a DVR condition;
2) initiate injection of power into the electric grid via a distributed system of power modules; and
3) maintain the injection of power into the electric grid and absorption of power from the grid, even under depressed area voltage conditions, for a predetermined period of time, e.g., 30 seconds.

Figure 2:
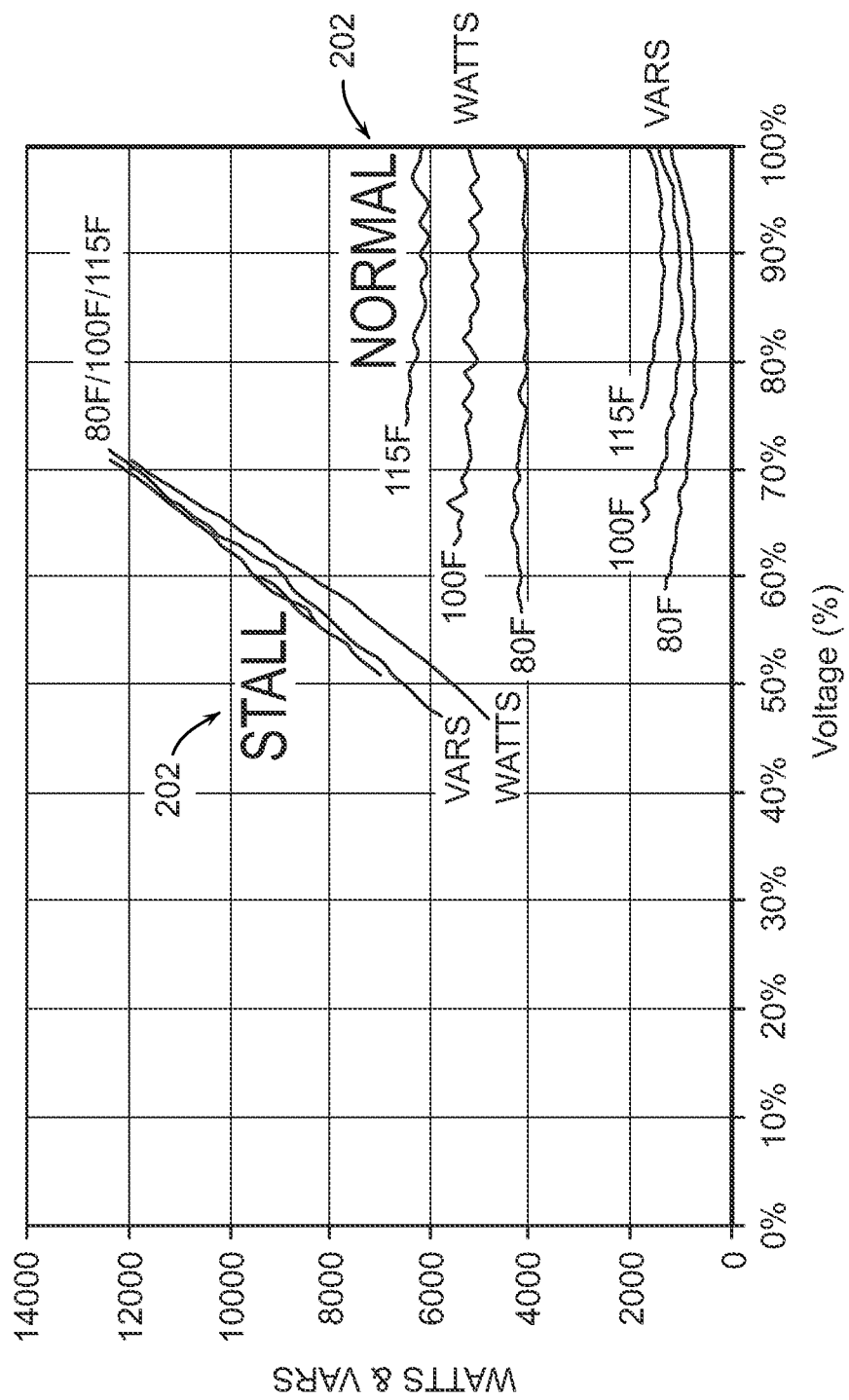
FIG. 2 depicts typical power characteristics in a power line for both normal conditions and for stall conditions.

FIG. 2 depicts typical power characteristics in a power line for both normal conditions 220 and for stall conditions 225. The y-axis of the graph is watts and VARS, the x-axis is percent voltage. As shown in FIG. 2, in normal operating conditions 220, the wattage in the power line is significantly higher than the VARs in the power line (about a 2:1 ratio) and both wattage and VARs are in a relatively stable state with respect to increasing voltage percentage (x-axis). As discussed above, when a fault occurs on a power line or grid with an accompanying voltage drop in the line, the voltage drop can cause inductive loads on the line to stall. The stalling can result in an increased voltage drain on the power line, resulting in a delayed recovery to normal operating voltage (a DVR condition). As shown in FIG. 2, in a stalling condition 225, the VARs values exceed the watts values or are at least closer to a 1:1 ratio and both VARs and watts sharply increase with respect to voltage percentage. Further, FIG. 2 shows the 70% voltage threshold below which the DVR condition is present. 70% voltage threshold and below is the depth of voltage drop at which motors typically stall, but stay energized by pulling starting current. The stalled motors are the underlying physical cause of the time delay in the voltage recovery. Therefore, when a stall starts, which can result in a DVR, the power line experiences a discrete change in the voltage and the ratio of VARs to watts.

The DVR system described herein detects and triggers on these shifts in the ratio of VARs to watts and the voltage in the power line. The VARs to watts ratio also is related to the power factor of the power line. The power factor is the electric phase difference between voltage and current on utility power line. As used herein, real power refers to the portion of power that, averaged over a complete cycle of the AC waveform, results in net transfer of energy in one direction. As used herein, the portion of power due to stored energy, which returns to the source in each cycle, is known as reactive power. Apparent power refers to the combination of real and reactive power. Thus, the system also can use power factor as an indicator of a DVR condition. Specifically, a low power factor or a discrete drop in power factor can result in a DVR condition. These measurements provide the system the ability to discriminate between a non-DVR electric system conditions that may temporarily depress area voltages, versus an actual DVR condition. Further, other conditions can be used to detect a DVR condition, including harmonic content signature, waveform or shape of the current, or a current spike on the electrical grid.

Figure 3:
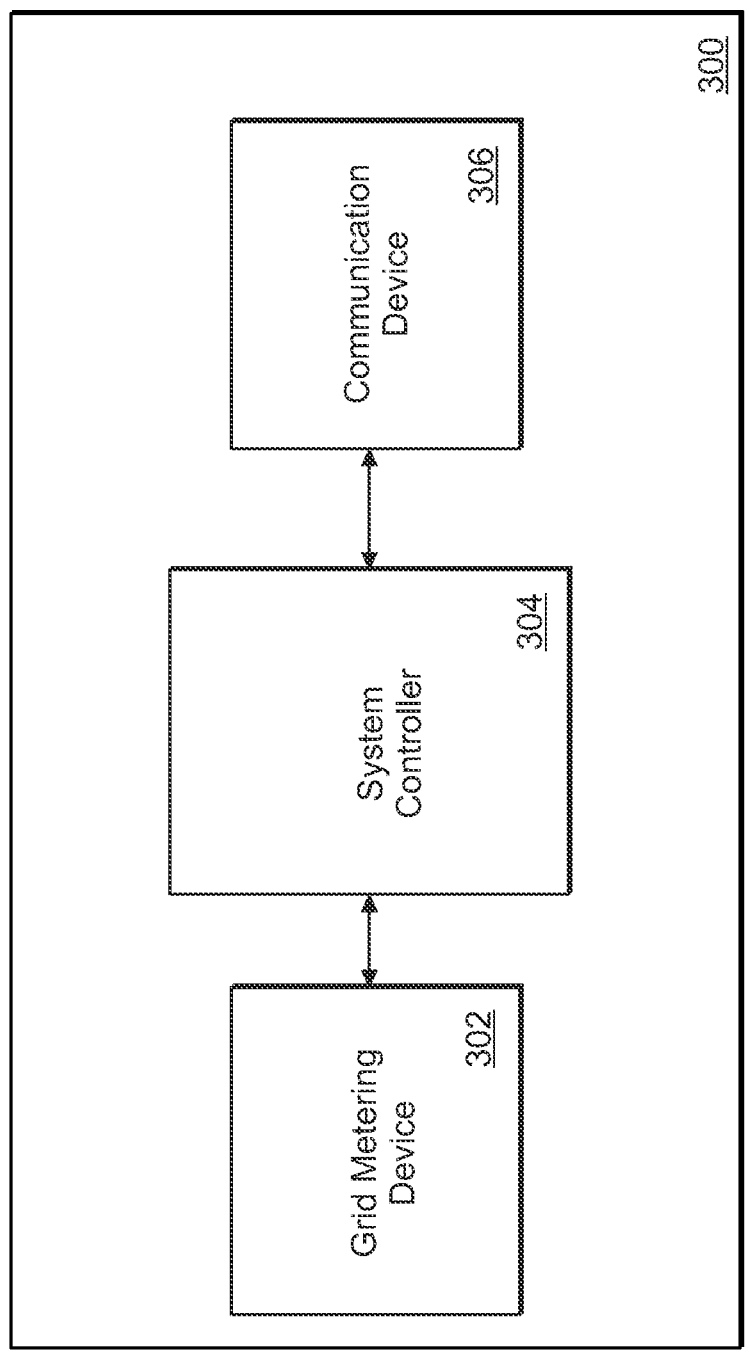
FIG. 3 is a block diagram of a grid module, according to one or more embodiments of the present disclosure.
Figure 4:
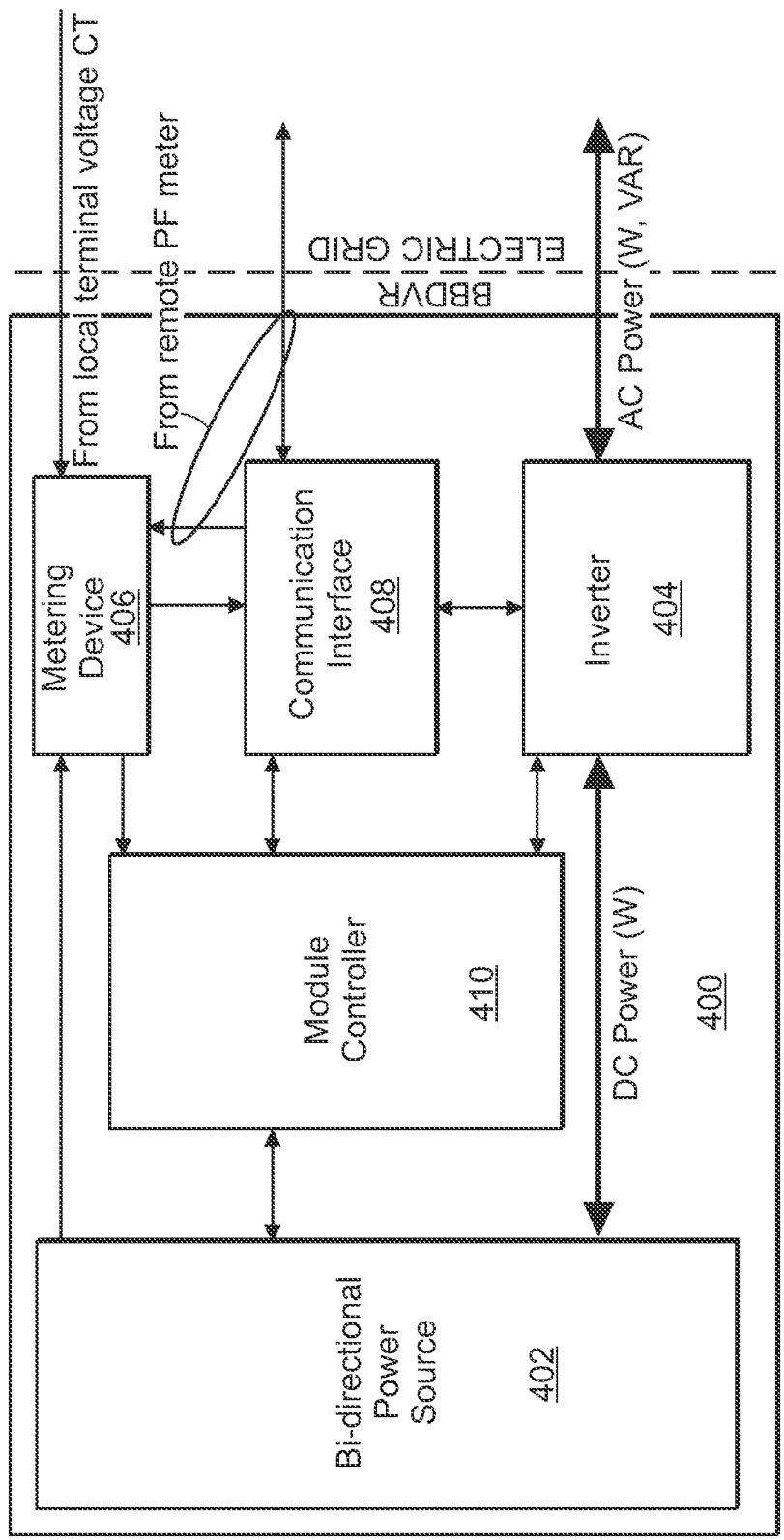
FIG. 4 is a block diagram of a power module, according to one or more embodiments of the present disclosure.

Block diagrams of the described system are provided as FIGS. 3 and 4. FIG. 3 depicts a grid module 300, which detects a DVR condition and notifies remote modules which implement countermeasures (to be described below). Grid module 300 includes a grid metering device 302 with the capability to measure the VARs, watts, and/or the power factor on a utility/power line. An exemplary grid metering device 302 is a LineTracker Conductor Mounted Sensor, manufactured by GridSense, Inc. (West Sacramento, Calif.). Grid metering device 302 constantly monitors power factor, VARS, watts and voltage of the grid. This information is passed to a system controller 304 located in grid module 300. Controller 304 determines if the information from metering device 302 indicates a DVR condition on the grid. Controller 304 can be a programmable logic controller, a digital based controller, a programmed processor or a computer. If controller 304, based on the information from grid metering device 302, determines that a DVR condition exists, controller 304 causes a communication device 306 to send an alert to distributed system of power modules (see FIG. 4). These power modules then inject a burst of power into the grid to provide a short term maximum power output in close proximity to where the DVR condition was detected. The timeframes involved, i.e. detect DVR condition within fraction of a second to several seconds, then trigger power module response within next 1-2 seconds, then sustain operation for 10-30 seconds, allow for use of a variety of standard communication links and protocols including copper wire, fiber optic, Ethernet, and radio.

While FIG. 3 depicts system controller 304 as co-located with grid metering device 302, in some embodiments, system controller 304 can be remotely located from grid metering device 302. In this embodiment, system controller 304 can receive information, for example, power factor and terminal voltage values, from a plurality of remotely located grid metering devices 302. In one embodiment, system controller 304 detects a DVR based on the measured power factor. System controller 304 also can measure the local terminal voltage at the system controller and use that value in conjunction with the power factor information received from the grid metering devices to determine if a DVR condition exists.

Figure 1:
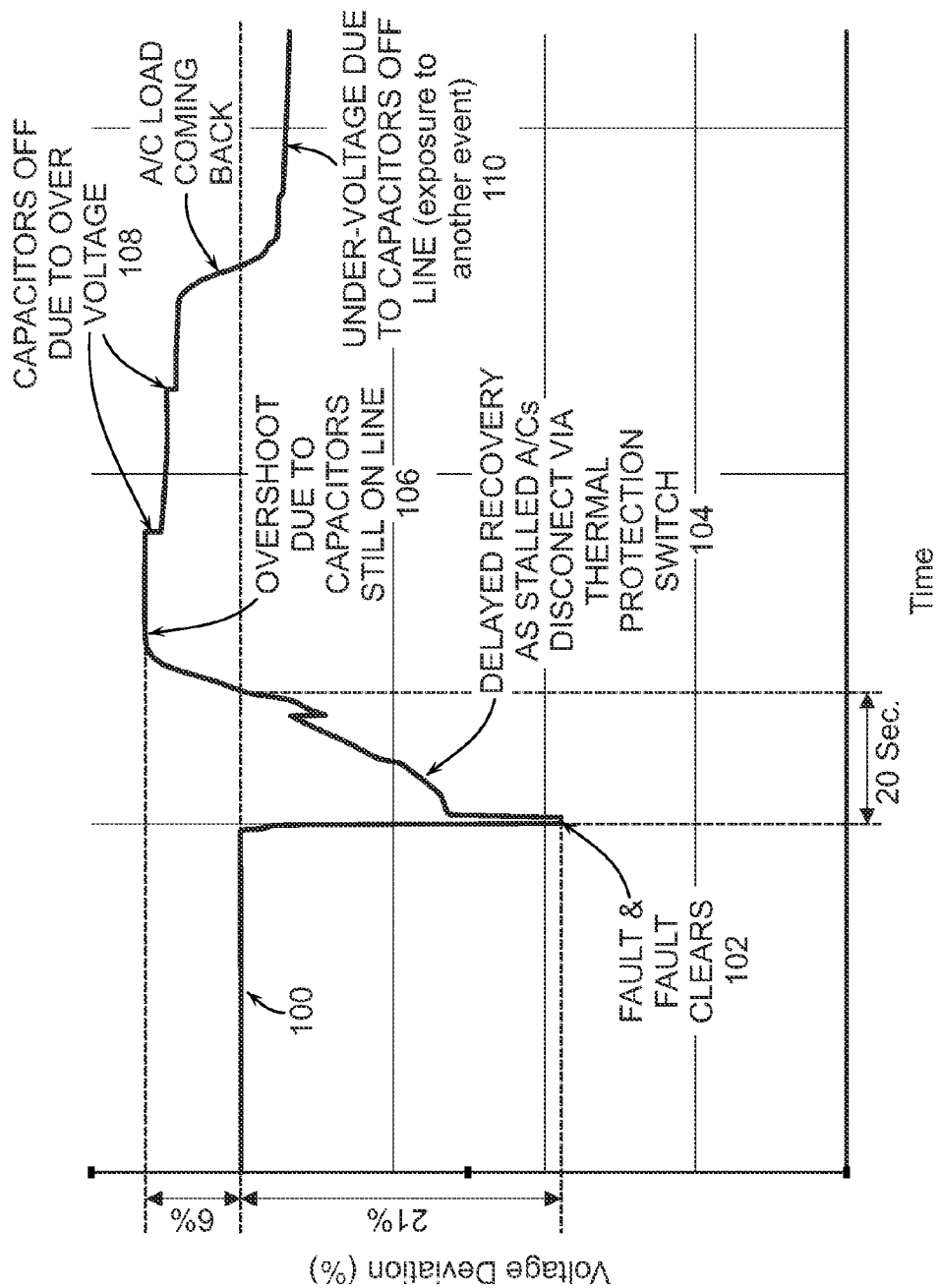
FIG. 1 illustrates a typical FIDVR following a 230-kV transmission fault.
Figure 5:
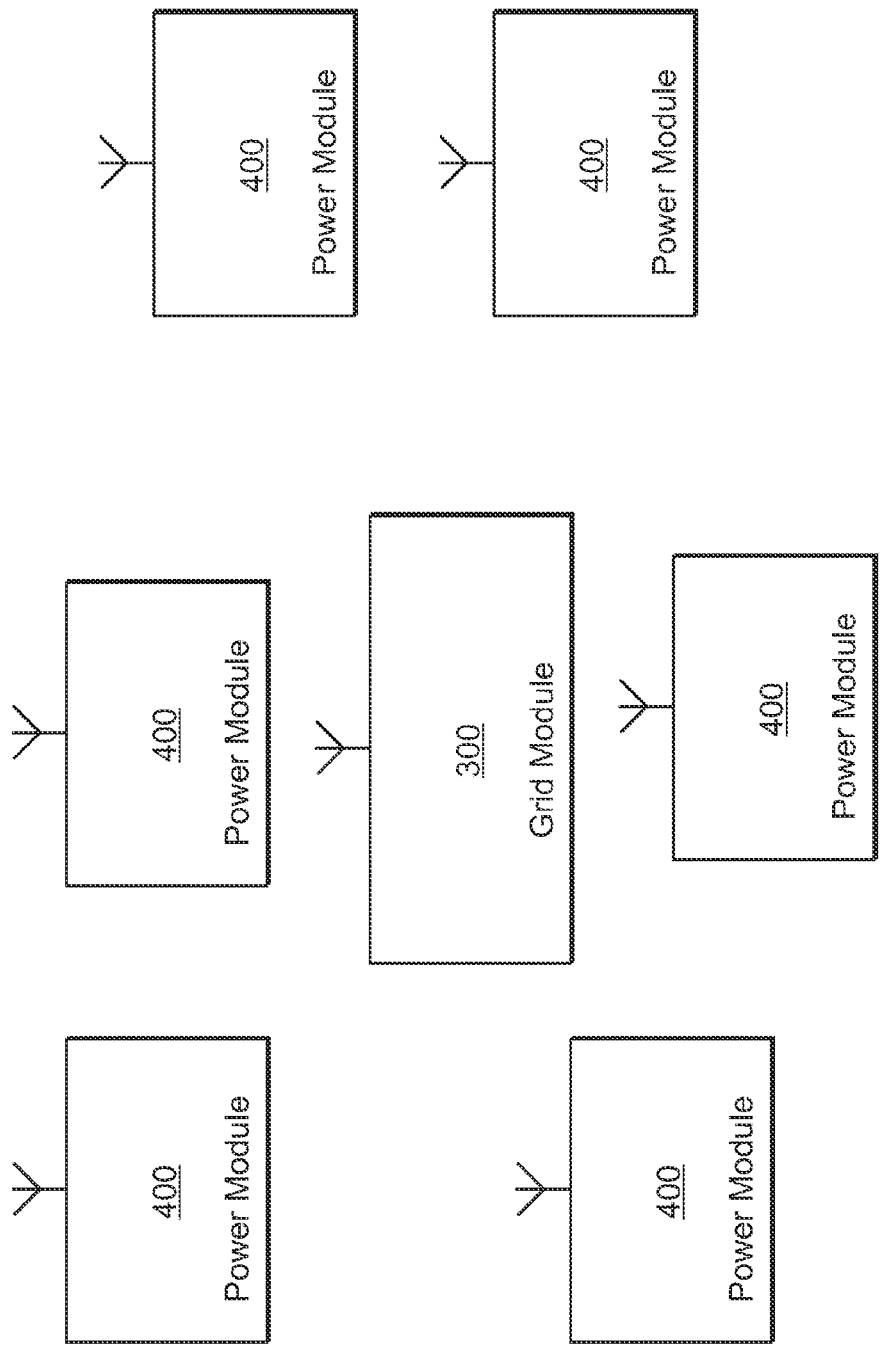
FIG. 5 is a block diagram of a grid module and a plurality of power modules, according to one or more embodiments of the present disclosure.
Figure 6:
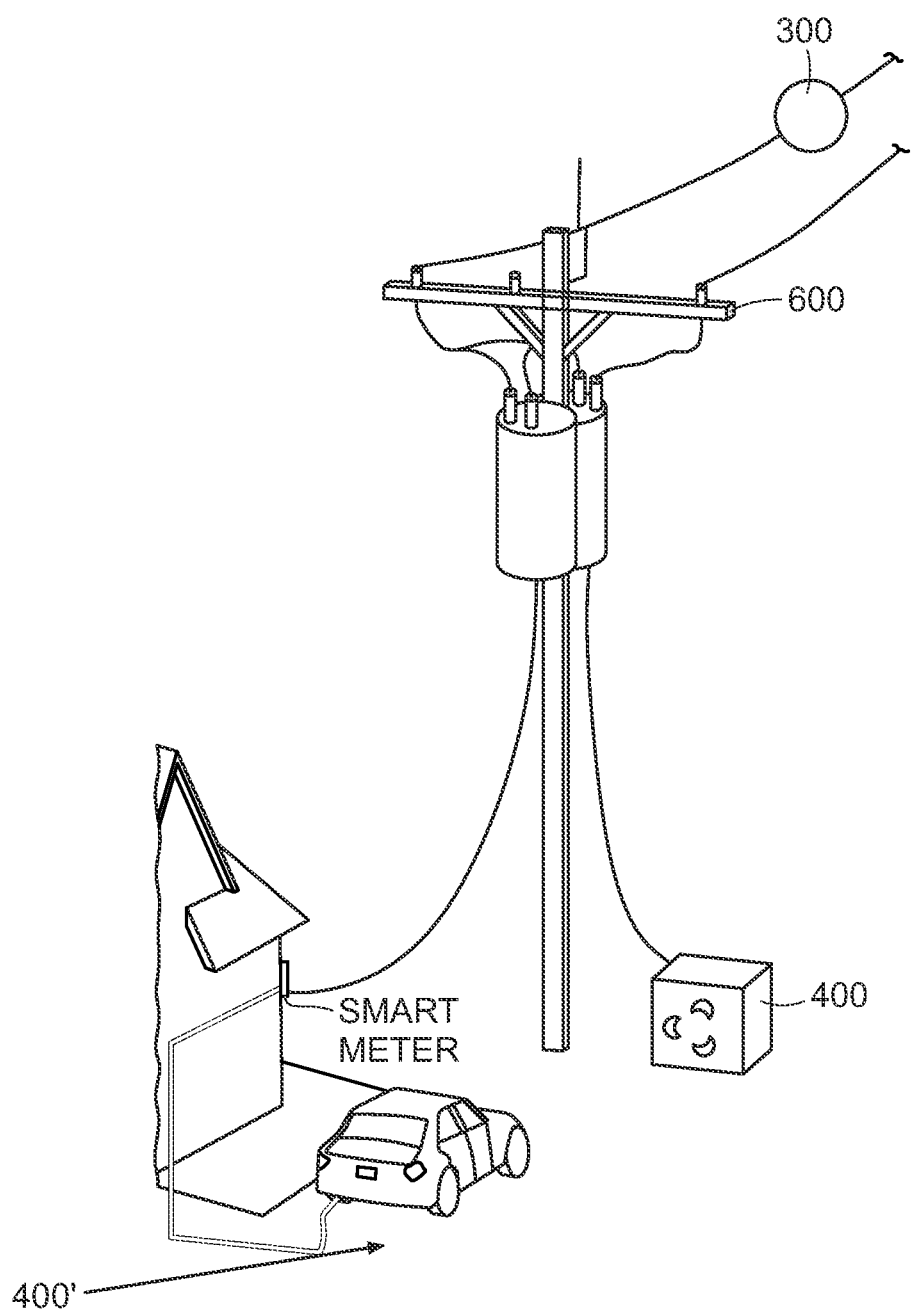
FIG. 6 is an illustration of grid module and two power modules on a utility line, according to one or more embodiments of the present disclosure.

FIG. 4 depicts a remotely located power source module 400. Power source module 400 includes a power source 402 to provide the power to be injected into (to boost low voltage and supply the current demand of stalled motors) or absorbed from (to reduce high voltage) the utility lines to counteract a DVR condition. Referring back to FIG. 1, power source module 400 injects power during period 104, when the voltage is depressed, and absorbs power at period 106, when the voltage is too high. As shown in FIG. 5, which depicts one grid module 300 and six power modules 400, all in wireless communication with each other, power source modules 400 can be part of a distributed system wherein each power module 400 can be located near a load, e.g. industrial equipment, motors, etc., or at a centralized location under utility control, for example, a transformer installation or a substation. Notably, the localized injection of power into the power line, close to the motor loads which might be causing the DVR condition, more efficiently and effectively corrects the DVR problem. Grid module 300 can be located anywhere in the grid, for example at a power station or on a remote utility line and can be located remotely or locally to the power source module 400. While FIG. 5 shows only one grid module, a plurality of grid modules could be in communication with a plurality of power modules. Additionally, although the grid module and the power modules are in wireless communication with each other in FIG. 5, the present disclosure is not limited to wireless communication and the various modules can communicate with each other through any communication scheme known to those of skill in the art, for example, copper wire, fiber optic, and Ethernet. While power source module 400 has been described herein as remotely located, power source module 400 could be located in close proximity to grid module 300. For example, FIG. 6 depicts a grid module 300 located on a power line 600. Proximate to the grid module 300 are two power modules 400, 400'. As shown in FIG. 6, power module 400 can be a network energy storage device, for example, as manufactured by A123 Systems. Power module 400' can be a plug-in hybrid or electric vehicle parked and charging at an owner's residence.

Power source module 400 includes the following components:
1) a bi-directional power source 402, for example, a battery, that can deliver and sustain real and reactive power, even under severely depressed voltage conditions;
2) an inverter 404, for example, a power electronics interface between power source 402 and electric grid;
3) a module metering device 406 for measuring a terminal voltage at power module 400;
4) a communication interface 408 to receive communication from grid metering module 300; and
5) a module controller 410 to manage these discrete subsystems.

Bi-directional power source 402 can be any electrochemical, mechanical or thermal device capable of delivering a significant amount of power in under two seconds, i.e., responding from offline to full capacity, and can sustain the power delivery for a time period long enough to counteract a DVR event, for example, approximately thirty seconds. Further, bi-directional power source 402 can, once online, cycle in a random manner (move from charge/discharge up to full capacity in either direction) without causing power device or damage. Bi-directional power source 302 can be, for example, a high power battery, such as batteries manufactured by A123 Systems, Inc. (Watertown, Mass.). The power modules can range from small batteries in electric cars (e.g., a vehicle to grid system) to large arrays of batteries located at a power station or facility. Both the aggregated effect of small distributed battery systems and a large injection from power from a single source can effectively mitigate a DVR condition. Because the disclosed DVR system can use distributed power sources with varying capabilities, the countermeasure to the DVR event can be narrowly tailored to address the specific DVR event at issue. For example, based on the type of DVR condition measured or detected, system controller can activate all power modules in the grid, (e.g., for a large, distributed DVR) or a select few smaller power modules (e.g., for a smaller, localized DVR). Other examples of a bi-directional power source that could be used include an ultra-capacitor (energy capacitor) or a flywheel (or other mechanical energy storage) based devices. Bi-directional power source 402 can operate as either a power source or a load. As load, the bi-directional power source 402 can recharge itself by absorbing power from the grid.

Inverter 404 is the connection between power source 402 and the electric grid. Inverter 404 has the following characteristics: (1) the ability to instantly change output level and direction (e.g., absorbing or injecting) within milliseconds; (2) the ability to apportion the output between reactive (VARS) and real power (Watts) and (3) a modern digital communication and control interface which includes a SMART Grid interoperable control interfaces to enable inverter 404 to talk to a variety of devices on the power system. Thus, inverter 404 apportions the power injection and/or absorption to mirror or counter the existing VAR conditions on the power line in order to balance and stabilize the real, apparent, and reactive power on the line. Inverter 404 also converts the DC power into AC power. The existing conditions on the power line are determined through the use of module metering device 406.

Communication interface 408 communicates with module controller 410 and metering device 406. Communication interface 408 receives remote communications from communication device 306 of grid module 300.

Module metering device 406 measures a local terminal voltage at power module 400, i.e., a terminal voltage from the energy storage device. Module metering device 406 can be any type of voltage measuring device known to those of skill in the art.

Module controller 410 is programmed to control the operation of bi-directional power source 402, communication interface 408 and inverter 404. Communication interface 408 receives an indication that a DVR condition exists from communication device 306 of grid module 300. If a DVR condition exists, module controller 410 triggers power source 402 to deliver a burst of power to the power grid. Module controller 410 determines the power to be added or absorbed from the grid based on the terminal voltage measurements made by module metering device 406. Based on the terminal voltage, module Controller 410 determines (1) magnitude of power, (2) direction and (3) apportionment between Watts/VARS to provide and sustain the appropriate levels of real and reactive power to the power grid. Inverter 404 executes the instructions from module controller 410 within a millisecond and delivers and sustains the appropriate levels of real and reactive power to the power grid. Module controller 410 will continue to instruct inverter 404 to output or absorb power until the measured terminal voltage values from module metering device 406 return to their steady state values. In some instances, module controller 410's determination could be overridden by an external operator dispatch, for example, a dispatch to remove the load from the line.

The disclosed DVR system operates as follows, grid metering devices 302 monitor conditions on the electrical grid. Based on these conditions system controller 304 will determine if there is a DVR event by detecting a relative shift in power factor on the electric grid. In some embodiments, the local terminal voltage can be used in conjunction with the power factor measurements to detect a DVR event or condition. If one or either of the power factor or terminal voltage drops below a threshold value, the system can determine that a DVR condition exists. If system controller 304 detects a DVR, grid module 300 communicates the existence of the DVR event to a plurality of remotely distributed power modules 400. Then, these power sources, based on local measured terminal voltage at each power module, inject or absorb power into or from the electric grid until the DVR event has been counteracted, or power module capacity and/or ratings have been exceeded and output must be reduced or stopped. During the DVR event, the voltage of the power line is continually monitored by module metering device 406 and based on this information, power module 400 will either continue to either inject power into the electrical grid or absorb power from the grid.

As discussed above, the system can include a plurality of grid metering device and remote power modules distributed across a power grid. Each grid metering device monitors the condition of the power lines where it is located and reports conditions back to one or more system controllers. When the system controller detects a fault or DVR condition, the system controller determines, based on the VAR, wattage, power factor, and voltage values measured by the grid metering device, which remote power sources should be enabled. Based on the DVR condition detected, in some situations, system controller request that all available power sources activate to counteract the DVR. In other situations, system controller instructs specific power modules to activate. Further, the DVR system can contain multiple system controllers to determine if a DVR condition exists and each system controller can communicate with a plurality of power modules. Once enabled, local control at the activated power module will modulate the power output (inject or absorb) to the power line to compensate for the post-fault voltage deviations (low and high), until the voltage normalizes. For example, one DVR event may result in the triggering of one remote power source adjacent to the event or, the system may determine that a plurality of power sources are required to counteract the DVR event. Therefore, the system provides a flexible solution to solving DVR problems on power grids by using a unique distributed metering and correction system.

While there have been shown and described examples of the present invention, it will be readily apparent to those skilled in the art that various changes and modifications may be made therein without departing from the scope of the invention.

What is claimed is:

1. A system comprising:
   a grid metering device for monitoring electrical power grid conditions;
   a system controller for determining if the grid metering device is detecting a condition on the electrical grid that is indicative of a delayed voltage recovery event, comprising determining (1) a decrease in voltage percentage and (2) a decrease in a ratio of watts to VARs;
   a remotely located bi-direction power source module comprising:
      a bi-directional power source configured to both inject power to the electrical power grid or extract power from the electrical power grid;
      an inverter for connecting the bi-directional power source to the electrical grid;
      a communication interface for receiving communications;
      a module metering device for measuring one or more characteristics of the electrical grid; and
      a module controller in electrical communication with the inverter, the communication interface and the module metering device; and
   a communication device for communicating with the communication interfaces of one or more remotely located bi-directional power source modules connected to the electrical power grid;
   wherein the system controller is programmed to send a notification via the communication device to the one or more remotely located bi-directional power source modules if the system controller detects a condition indicative of delayed voltage recovery event;
   wherein the module controller is programmed to respond to the notification of a delayed voltage recovery received from the communication device by causing the inverter to counteract the delayed voltage recovery event; and
   wherein the inverter counteracts the delayed voltage recovery by injecting power from the bi-direction power source into the electric grid or extracting power from the electrical grid based on the one or more characteristics measured by the module metering device.

2. The system of claim 1, wherein the bi-directional power source comprises a battery.

3. The system of claim 1, wherein the bi-directional power source comprises an energy capacitor or a mechanical energy storage device.

4. The system of claim 1, wherein the electrical power grid conditions comprise power factor.

5. The system of claim 1, wherein the electrical power grid conditions comprise a change in the voltage and ratio of VARs to Watts.

6. The system of claim 1, wherein the one or more conditions measured by the module metering device comprise terminal voltage.

7. A system comprising:
   a metering device for monitoring electrical power grid conditions;
   a controller for determining if the metering device is detecting a condition on an electrical grid that is indicative of a delayed voltage recovery event, comprising determining (1) a decrease in voltage percentage and (2) a decrease in a ratio of watts to VARs; and
   a communication device for communicating with one or more remotely located bi-directional power source modules connected to the electrical power grid,
   wherein the controller is programmed to send a notification via the communication device to the one or more remotely located bi-directional power source modules if the controller detects a condition indicative of delayed voltage recovery event.

8. The system of claim 7 wherein the metering device comprises a grid metering device.

9. The system of claim 7, wherein the electrical power grid conditions comprise power factor.

10. The system of claim 7, wherein the electrical power grid conditions comprise a change in the voltage and ratio of VARs to Watts.

11. A system comprising:
    a bi-directional power source configured to both inject power to an electrical grid or extract power from the electrical grid;
    an inverter for connecting the bi-directional power source to the electrical grid;
    a communication interface for receiving communications from a remote device;
    a metering device for measuring one or more characteristics of the electrical grid; and
    a controller in electrical communication with the inverter, the communication interface and the metering device,
    wherein the controller is programmed to respond to a notification of a delayed voltage recovery, wherein the delayed voltage recovery comprises (1) a decrease in voltage percentage and (2) a decrease in a ratio of watts to VARs, received from the communication interface from a remotely located device by causing the inverter to counteract the delayed voltage recovery event; and
    wherein the inverter counteracts the delayed voltage recovery by injecting power from the bi-directional power source into the electric grid or extracting power from the electrical grid based on the one or more characteristics measured by the metering device.

12. The system of claim 11, wherein the bi-directional power source comprises a battery.

13. The system of claim 11, wherein the bi-directional power source comprises an energy capacitor or a mechanical energy storage device.

14. The system of claim 11, wherein the metering device comprises a terminal voltage metering device.

15. A method comprising:
    monitoring one or more conditions on an electrical grid;
    determining if the one or more conditions on the electrical grid is indicative of a delayed voltage recovery event, comprising determining (1) a decrease in voltage percentage and (2) a decrease in a ratio of watts to VARs; and
    transmitting a notification to one or more remotely located bi-directional power source modules if a condition indicative of delayed voltage recovery event is determined, wherein the remotely located bi-directional power source is configured to inject power to the electrical power grid or extract power from the electrical power grid based on the notification.

16. The method of claim 15, wherein the electrical grid conditions comprise one of power factor or a change in the voltage and ratio of VARs to Watts.

17. A method comprising:
    receiving a notification of a delayed voltage recovery from a remote device, wherein the delayed voltage recovery comprises (1) a decrease in voltage percentage and (2) a decrease in a ratio of watts to VARs;
    measuring one or more characteristics of the electrical grid; and
    counteracting the delayed voltage recovery event by injecting power from a remotely located bi-direction power source into the electric grid or extracting power from the electrical grid based on the one or more of the measured characteristics.

18. The method of claim 17, wherein the bi-directional power source comprises a battery.

19. The method of claim 17, wherein the bi-directional power source comprises an energy capacitor or a mechanical energy storage device.

20. The method of claim 17, wherein the characteristics of the electrical grid comprise terminal voltage.

21. A method comprising:
monitoring one or more conditions on an electrical grid;
determining if the one or more conditions on the electrical grid is indicative of a delayed voltage recovery event, comprising determining (1) a decrease in voltage percentage and (2) a decrease in a ratio of watts to VARs;
transmitting a notification to one or more remotely located bi-directional power source modules if a condition indicative of the delayed voltage recovery event is determined;
measuring at the remote location one or more characteristics of the electrical grid; and
counteracting the delayed voltage recovery event by injecting power from the remotely located bi-direction power source into the electric grid or extracting power from the electrical grid based on the one or more characteristics measured at the remote location.

22. The method of claim 21, wherein the conditions on the electrical grid comprises one of power factor or a change in the voltage and ratio of VARs to Watts.

23. The method of claim 21, wherein the bi-directional power source comprises a battery.

24. The method of claim 21, wherein the bi-directional power source comprises an energy capacitor or a mechanical energy storage device.

25. The method of claim 21, wherein the characteristics measured at the remote location comprise terminal voltage.

* * * * *